United States Patent
Cheong et al.

[11] Patent Number: 5,888,667
[45] Date of Patent: Mar. 30, 1999

[54] SEPARATOR FOR JELLY-ROLL TYPE ELECTRODE

[75] Inventors: Jin Dong Cheong, Kyungki-do; Jong Wook Lee; Byoung Hyun Kang, both of Suwon, all of Rep. of Korea

[73] Assignee: Samsung Display Devices Co., Ltd., Kyungki-do, Rep. of Korea

[21] Appl. No.: 876,503

[22] Filed: Jun. 16, 1997

[30] Foreign Application Priority Data

Jun. 19, 1996 [KR] Rep. of Korea .................. 1996-22308

[51] Int. Cl.$^6$ ...................................................... H01M 4/00
[52] U.S. Cl. ............................ 429/94; 429/133; 429/134; 429/135; 429/165; 29/623.1; 29/623.3; 29/623.5
[58] Field of Search ................................ 429/94, 133, 134, 429/135, 165; 29/623.1, 623.3, 623.5

[56] References Cited

U.S. PATENT DOCUMENTS

| | | | |
|---|---|---|---|
| 4,375,501 | 3/1983 | Peled et al. | 429/94 |
| 4,385,101 | 5/1983 | Catanzarite | 429/94 |
| 4,444,854 | 4/1984 | Hooke | 429/94 |
| 4,802,275 | 2/1989 | Freluche | 29/623.4 |
| 5,238,757 | 8/1993 | Suzuki et al. | 429/94 |
| 5,508,122 | 4/1996 | Narukawa et al. | 429/94 |
| 5,532,074 | 7/1996 | Golben | 429/94 |
| 5,631,102 | 5/1997 | Spilllman et al. | 429/94 |
| 5,637,416 | 6/1997 | Yoshii et al. | 429/94 |
| 5,658,683 | 8/1997 | Kageyama et al. | 429/94 |
| 5,736,270 | 4/1998 | Suzuki et al. | 429/94 |

FOREIGN PATENT DOCUMENTS

| | | |
|---|---|---|
| 0197426 | 10/1986 | European Pat. Off. |
| 20552 | 10/1996 | Rep. of Korea . |
| 859884 | 1/1961 | United Kingdom . |
| 1511395 | 5/1978 | United Kingdom . |
| 2184594 | 6/1987 | United Kingdom . |
| 2206990 | 1/1989 | United Kingdom . |
| WO9016089 | 12/1990 | WIPO . |

*Primary Examiner*—Bruce F. Bell
*Attorney, Agent, or Firm*—Christie, Parker & Hale, LLP

[57] ABSTRACT

The unnecessary portion of the separator which prevents the short-circuit between the cathode and the anode In the center of a cylindrical cell is cut off using cutting apparatus or laser beam to increase the inner space of the cell and the electrolyte, and to have higher cell capacity and lower inner pressure of the can while producing gas.

10 Claims, 3 Drawing Sheets

SEPARATOR FOR JELLY-ROLL TYPE ELECTRODE

BACKGROUND OF THE INVENTION (a) Field of the Invention

The present invention relates to a group of winding electrodes. More particularly, is relates to a group of winding electrodes removing an unnecessary separator in the center of cylindrical nickel-hydrogen cell to increase the inner space and the electrolyte solution of the cell, and to have higher capacity and lower pressure of a can while producing a gas.

(b) Description of the Related Arts

A group of winding electrodes such as a cylindrical cell and a condenser has a separator to prevent a short-circuit of the cathode and the anode. The present invention relates to a technology of a group of winding electrodes having cathode, anode and separator. A cylindrical cell, especially a cylindrical nickel-hydrogen cell, is described as an example.

More and more portable electronic devices such as a camera, a camcorder, a portable CDP, a radio, a cassette, a notebook computer, a pager and a cellular phone, etc. require a cell having higher capacity and longer durability.

In general, a cell is a device that converts chemical energy into electric energy by means of contact potential difference and it has many kinds of thereof. Electrochemical cells and batteries are technologically identified as a nonchargeable primary cell or a rechargeable secondary cell or a fuel cell that converts combustion heat into electric energy or a solar cell that converts light energy into electric energy. Electrochemical cells and batteries are classified by the composition of electrolyte and shape of the cells and batteries. The composition of electrolyte and shape are alkaline, solid or nonaqueous cells and cylindrical, button or coin types respectively.

In these kinds of cells, a cylindrical cell (jelly-roll type) discharges current and is composed of a cathode, an anode, a separator to prevent a short-circuit of the cathode and the anode, electrolyte, a positive terminal, and a negative terminal. To describe specifically, the structure of a nickel-hydrogen cell is illustrated in FIG. 5. The cylindrical nickel-hydrogen cell is composed of a cathode (13) coated with $Ni(OH)_2$ as a positive active material, an anode (15) of hydrogenated alloy coated with a negative active material which is mainly composed of $LaNi_5$, $MmNi_5$, Ti—Fe or Ti—Ni alloy, a separator (17) which is made of a nonwoven fabric and a cellophane tape to prevent a short-circuit of the cathode (13) and the anode (15), a cap (19) as a positive terminal, and a case (11) as a negative terminal and packaging equipment, and besides a gasket (21), a safety vent (23), a cover plate (25), an insulating tube (27),and an insulating plate (29).

The process for producing a cylindrical nickel-hydrogen cell is as follows. First, cathode is manufactured by coating a slurry of a positive active material, drying, and rolling on a metallic support, and then an anode is manufactured by coating a slurry of a negative active material, drying, and rolling on a metallic support. After that, a separator is laid between the cathode and the anode, and is wound. In this wound assembly of electrodes and the separator is inserted into a can. After that, an electrolyte is poured into the can and a cap assembly is mounted in the mouth of the upper part.

A detailed description about the charge and the discharge reaction of the cylindrical nickel-hydrogen cell manufactured according to the above method is as follows.

A hydrogenated alloy is used as a negative active material, nickel hydroxide is used as a positive active material and potassium hydroxide(KOH) aqueous solution is used as an electrolyte. The hydrogenated alloy store hydrogen ions produced by cleavage of water in the electrolyte during the charging process, and releases hydrogen ions into the electrolyte during the discharging process. The charge and discharge reactions are as follows.

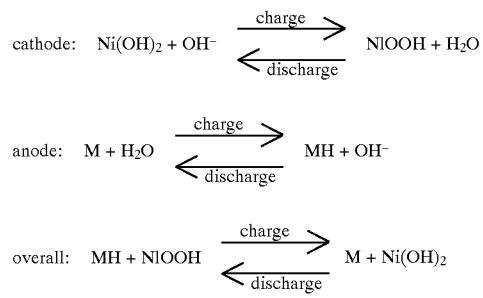

In the above reactions, M is a hydrogenated alloy that can absorb and emit hydrogen ions, identified as an $AB_5$ group that is made of rare earth elements or an $AB_2$ group that is made of Ti, Zr, V, etc. According to the above reaction, a cell performs a charge and discharge more than hundreds of times.

The process for producing the cylindrical nickel-hydrogen cell comprises locating the cathode (13) and the anode (15) in the opposite side of the separator (17) and winding the separator (17) using a mandrel as shown in FIG. 1. FIG. 2 is a cross-sectional view of a cylindrical cell inserted the plates and the separator therein. As shown in FIG. 3, when winding the cathode (13) and the anode (15), the portion which the separator is not piled on the plates, is overlapped in the center of the cell. The portion cannot make a role of the separator (17), which prevents short-circuit of the cathode (13) and the anode(15), to be unnecessary. The separator (17) is occupied the space, in which the electrolyte solution contains, therefore the problems that the electrolyte solution amount in the cell is decreased to have lower cell capability and the shorter durability.

SUMMARY OF THE INVENTION

Accordingly, the present invention is intended to overcome the above-identified disadvantage of conventional arts and provide a cylindrical cell which make the inner space large to have higher cell capability and shorter inner pressure.

An embodiment of the present invention is a group of winding electrodes comprising a cathode, an anode, a positive terminal linked to said cathode, an negative terminal linked to said anode, a separator between said cathode and said anode and an electrolyte solution, wherein said cathode, said anode and said separator is wound, the improvement comprising said separator is cut off from the center of the overlapped portion thereof.

The separator is preferred to cut off 1–14 mm from the center thereof.

Another embodiment of the present invention is a process for a group of winding electrodes comprising the steps of manufacturing a cathode by coating a slurry of a positive active material, drying and rolling on a metallic support, manufacturing an anode by coating a slurry of a negative active material, drying and rolling on a metallic support, laying a separator between said cathode and said anode and winding said separator, inserting a wound assembly of electrodes and said separator in a can, pouring an electrolyte, and mounting a cap assembly in the mouth of an upper part thereof, wherein said separator is cut off the overlapped portion thereof from the center.

The separator is preferred to cut off 1–14 mm from the center thereof.

Cutting of said separator is preferred to be carried out by using a cutting apparatus or laser beam.

BRIEF DESCRIPTION OF THE DRAWINGS

The present invention will be described with reference to the accompanying drawings, in which.

DETAILED DESCRIPTION OF THE PREFERRED EMBODIMENTS

Although the invention has been described with reference to a preferred it is to be understood that the invention is not limited to the preferred embodiment as herein described.

EXAMPLE

A cathode and a anode of which were inserted in a can as the wound state were manufactured in the conventional process.

Namely, a cathode was manufactured by coating slurry of positive active material 82.8 weight which is mixed nickel hydroxide ($Ni(OH)_2$) of 44.8 weight, cobalt oxide of 8.5 weight, viscosity increasing material of 0.5 weight, binder of 2 weight, water of 27 weight, drying and rolling on a metallic support. A anode was manufactured by coating slurry of negative active material which is mixed hydrogenated alloy powder of 83.7 weight, carbon conductive material of 0.33 weight, viscosity increasing material of 0.17 weight, binder of 0.67 weight and water of 13.6 weight, drying and rolling on a metallic support.

The cathode and the anode were cut into prescribed size. And then, a separator nylon related nonwoven fabric was laid between the cathode and the anode to manufacture a wound assembly, wound the assembly and inserted it in a can.

Figure 1A:
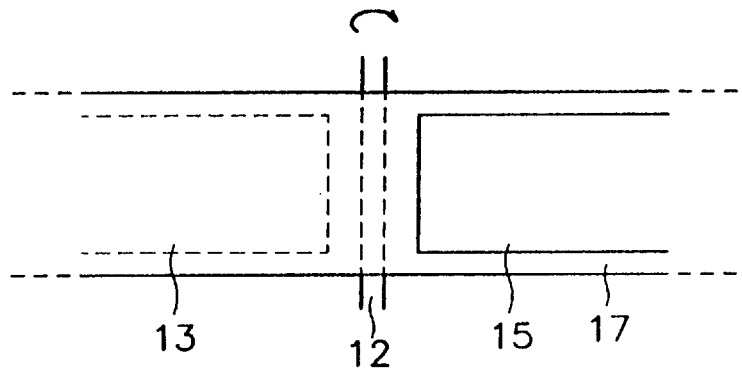
FIGS. 1A and 1B (FIG 1) are a plane view (A) and a front view of winding machine contains the plates, the separator around the winding axis thereof.
Figure 1B:
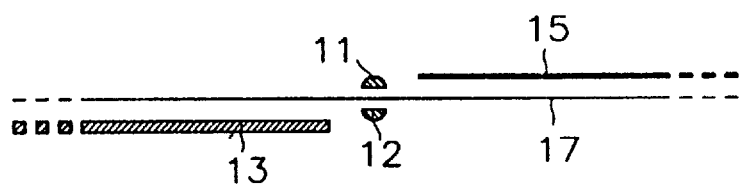
Figure 2:
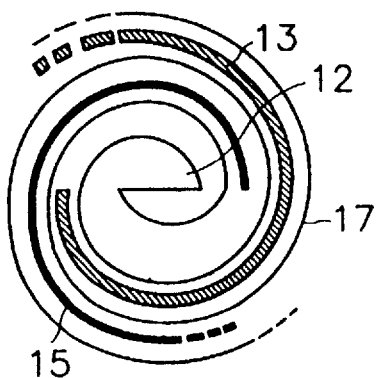
FIG. 2 is cross-sectional view of a cell of jelly-roll type inserted the plates and the separator therein after winding.
Figure 3:
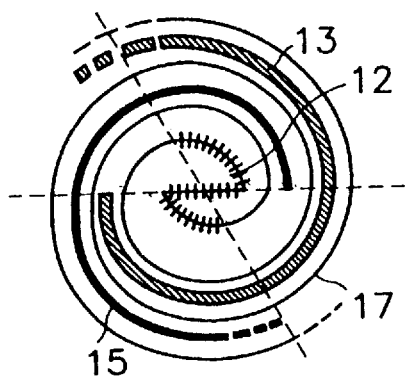
FIG. 3 is a cross-sectional view shown the unnecessary portion of the separator which will be cut off in the wound cylindrical cell.

As shown in FIG. 3, the overlapped portion of the separator was cut off 14 mm from the center thereof.

An electrolyte was poured into the can and mounted a cap assembly in the mouth of an upper part thereof to manufacture a group of winding electrodes.

Figure 4:
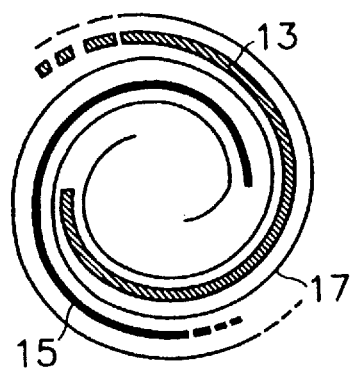
FIG. 4 is a cross-sectional view after cutting off the unnecessary portion of the separator in the wound cylindrical cell.
Figure 5:
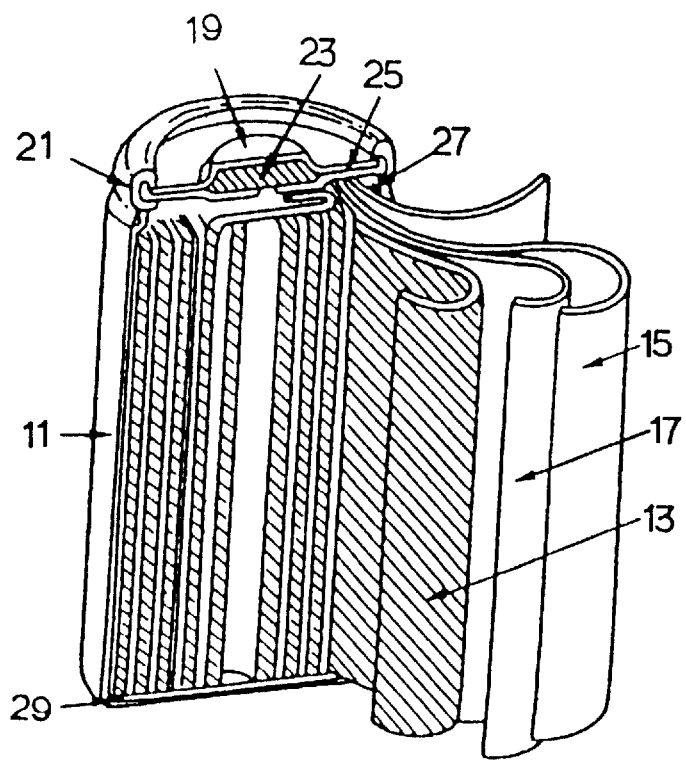
FIG. 5 is a brief view of the whole cylindrical cell.

The FIG. 4 shows a cross-sectional view after cutting off the center portion of the separator according to the present invention.

COMPARATIVE EXAMPLE

The cylindrical nickel-hydrogen cell was manufactured according to the above example except for cutting off the unnecessary portion of the wound separator.

The nickel-hydrogen cell was activated initially for 3 cycles in the condition of 0.1 C/150% charging and 0.2 C/0.9 V cut-off. Then it was discharged and charged repeatedly 200 times in the condition of 1 C/150% charging and 1 C/0.9 V cut-off.

The following table shows the results of measuring the internal space increasing rate, capacity and durability according to the above example and comparative example.

TABLE

|  | internal space increasing rate (%) | capacity gains (after 200 cycles) | durability |
|---|---|---|---|
| EXAMPLE | 20 | 20 mAh | above 400 cycles |
| COMPARATIVE EXAMPLE | 0 | none | above 300 cycles |

As shown in the above table, the additional space of about 3.8 to 6.0% in the basis of the volume of the separator was guaranteed in the can. After inserting the poles and the separator, internal space of maximum 20% was increased. Therefore, electrolyte enough for the cell could be injected and the decreased internal pressure made the cell more durable.

The internal space of the cell is increased by cutting off the unnecessary portion of the separator from the wound assembly of the cell according to the process of nickel-hydrogen cell of the present invention. Therefore the electrolyte amount is increased and the internal pressure in the can is decreased to produce the cell with high capacity and durability.

What is claimed is:

1. A group of winding electrodes, comprising:
   a cathode;
   an anode;
   a positive terminal linked to said cathode;
   an negative terminal linked to said anode;
   a separator between said cathode and said anode, wherein said cathode, said anode and said separator are wound, said separator being cut off from the center of the overlapped portion thereof; and
   an electrolyte solution between said cathode and said anode.

2. A group of winding electrodes, comprising:
   a cathode;
   an anode;
   a positive terminal linked to said cathode;
   an negative terminal linked to said anode;
   a separator between said cathode and said anode, wherein said cathode, said anode and said separator are wound, said separator being cut off approximately 14 mm from the center of the overlapped portion thereof; and
   an electrolyte solution between said cathode and said anode.

3. A process for winding electrodes, comprising the steps of:
   manufacturing a cathode by coating a slurry of a positive action material on a first metallic support, and drying and rolling the coated first metallic support;
   manufacturing an anode by coating a slurry of a negative active material on a second metallic support, and drying and rolling the coated second metallic support;
   laying a separator between said cathode and said anode and winding said separator to form a wound assembly;

inserting said wound assembly in a can, pouring an electrolyte in said can and mounting a cap assembly in a mouth of an upper part of said can; and cutting the overlapped portion of the separator at the center.

4. The process of winding electrodes of claim 3, wherein the cutting of said separator is carried out by using a cutting apparatus or laser beam.

5. A process for winding electrodes, comprising the steps of:

manufacturing a cathode by coating a slurry of a positive action material on a first metallic support, and drying and rolling the coated first metallic support;

manufacturing an anode by coating a slurry of a negative active material on a second metallic support, and drying and rolling the coated second metallic support;

laying a separator between said cathode and said anode and winding said separator to form a wound assembly;

inserting said wound assembly in a can, pouring an electrolyte in said can and mounting a cap assembly in a mouth of an upper part of said can; and cutting the overlapped portion of said separator approximately 14 mm from the center thereof.

6. A wound electrode assembly, comprising:

a cathode;

an anode;

a separator between said cathode and said anode and wound therewith, said separator having a central portion removed where said cathode and said anode do not overlap.

7. The wound electrode assembly of claim 6 wherein the removed portion of the separator extends from 1–14 mm.

8. The wound electrodes assembly of claim 6 wherein the portion of the separator removed is approximately 14 mm.

9. A wound electrode assembly, comprising:

a cathode;

an anode;

a separator between said cathode and said anode and wound therewith, said separator, in the unwound state with the cathode and the anode, having a gap extending from 1–14 mm in a central portion thereof where the cathode and the anode do not overlap.

10. The wound electrode assembly of claim 9 wherein said gap is approximately 14 mm.

* * * * *